United States Patent Office.

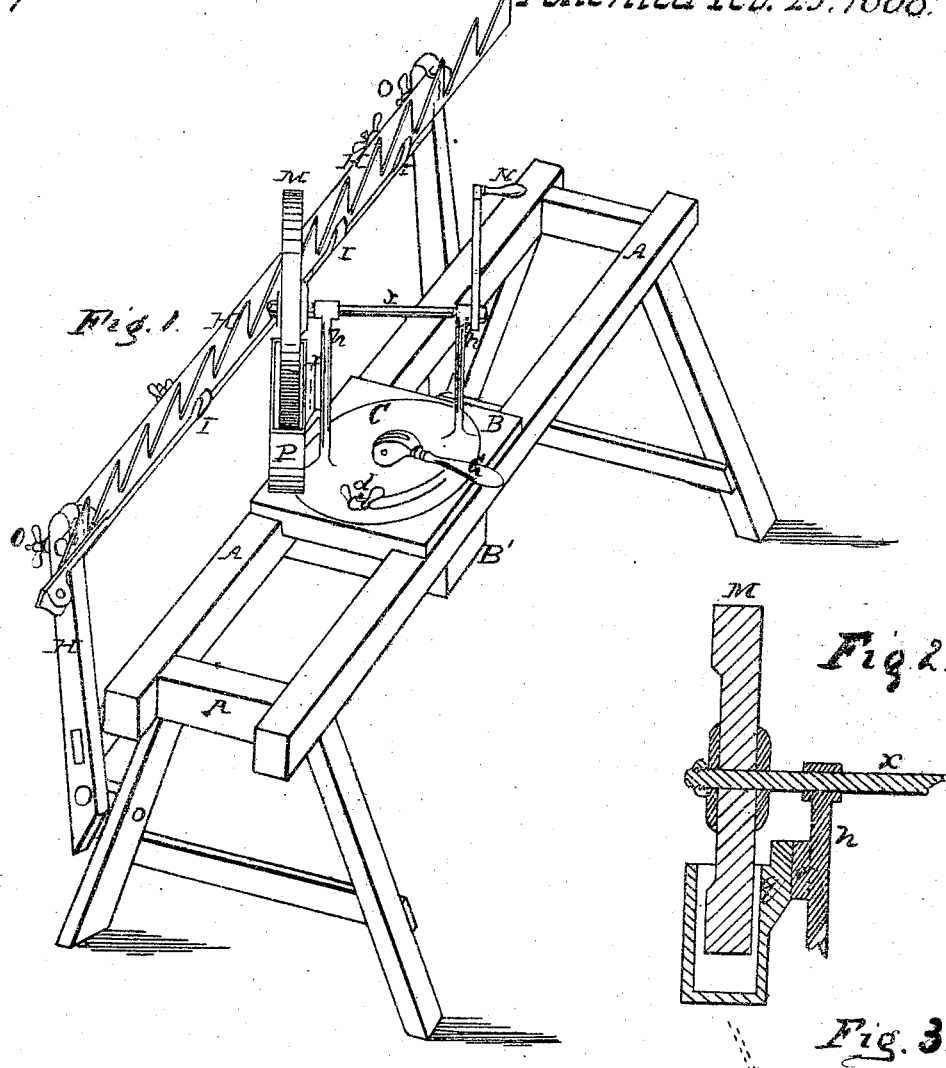

CHARLES RICHARDSON, OF AUBURN, NEW YORK.

Letters Patent No. 74,942, dated February 25, 1868.

---

IMPROVEMENT IN MACHINES FOR GRINDING REAPER-KNIVES.

---

The Schedule referred to in these Letters Patent and making part of the same.

---

TO ALL WHOM IT MAY CONCERN:

Be it known that I, CHARLES RICHARDSON, of the city of Auburn, in the county of Cayuga, and State of New York, have invented certain new and useful Improvements in Machines for Grinding Reaper-Knives and I do hereby declare that the following is a full, clear, and exact description of the construction and operation of the same, reference being had to the annexed drawings, making a part of this specification, in which—

Figure 1 represents the complete machine, with my improvements thereon, when ready to be operated.

Figure 2 represents a view of a section of said machine, including the grindstone, the water-tank or reservoir, with its attachment to the grindstone-frame, and of parts of said frame.

Figure 3 represents a section of the swing-frame, and the manner of fastening the adjustable top-piece thereof.

O O are the screw-bolts, by which the adjustable top-piece of the swing-frame is fastened in any desirable position. P is the reservoir or water-tank, directly under the grindstone M. $q$ is the piece attached to the side of said reservoir or water-tank, by which it is hung to the frame which supports the grindstone. $r$ is the tongue-piece, formed upon or rigidly attached to said frame, to which said reservoir or water-tank is suspended.

For the explanation of the other parts of the drawing, reference is hereby made to the specification and drawings annexed to Letters Patent granted to Edwin M. Scott, of Auburn, for "Improvements in Machines for Grinding Reaper-Knives," bearing date July 30, 1867, and numbered 67,365.

The nature of my invention consists, first, in making the top-piece of the swing-frame H adjustable in any desired position, and thereby enable the operator to grind the knives or sections of any desired bevel; second, in hanging the reservoir water-tank to the framework which supports the grindstone, so that it shall at all times move with the stone, and be always in the same relative position therewith.

The machine in all other respects may be constructed as described in the specification annexed to the said patent of said Scott, or in any other manner desired, as my improvements are not confined to any particular pattern in regard to other parts of the machine.

In regard to my first improvement, I make the swing-frame H with clamps I I I, for the purpose of holding the reaper-bar while the knives are being ground. But instead of attaching the top part of said swing-frame, to which said reaper-bar is thus fastened, rigidly to the side-pieces, I attach the same thereto adjustably, as follows, by passing a screw-bolt, having an eye at one end thereof, through each of said side-pieces, near the top thereof, and rounding each end of said top-piece, so that the same will pass through said eyes, which enables the operator to adjust said reaper-bar and knives so that the same shall form any desired angle with said grindstone, and thereby the said operator, in grinding, is enabled to form the bevel upon said knives at any angle desired.

In regard to my second improvement, that the water-tank or reservoir may hang directly under the grindstone, and be moved with it at all times, I attach a piece, $q$, rigidly to the side of said water-tank or reservoir, or the same may be cast as a part thereof. Upon or in the side of this piece $q$, I cut a groove to fit the tongue-piece $r$, which is fastened upon or cast as a part of one of the standards $h$, upon which the stone is hung. When it is desired to use the reservoir or water-tank, it is only necessary to ship the said grooved piece $q$ upon the tongue-piece $r$, and the reservoir or water-tank will then hang directly under the grindstone, and being fastened to and upon one of the standards $h$, upon which the stone is hung, it must necessarily move with the stone whenever the position of that shall be changed, thus always remaining in place directly under the grindstone.

Having thus fully described my invention, and the several parts thereof, and the manner in which I contemplate using the same, and the operation and effect thereof; what I claim therein as new, and desire to secure by Letters Patent, is—

1. Making the top-piece of the swing-frame H, to which the cutter is fastened when the knives are to be ground, adjustable, and using the same in combination with the adjustable grindstone, in the manner and for the purpose substantially as described.

2. Affixing the water-tank or reservoir P to one of the standards which support the grindstone, so that the same shall at all times hang directly under said stone, and using the same in combination with an adjustable grindstone hung upon a movable plate or disk, substantially as and for the purpose described.

CHAS. RICHARDSON.

Witnesses:
D. WRIGHT,
S. A. SHERWIN.